United States Patent [19]

Eiting et al.

[11] Patent Number: 4,470,331

[45] Date of Patent: Sep. 11, 1984

[54] SLITTING APPARATUS

[75] Inventors: John C. Eiting, Minster; Thomas J. Wente, New Bremen, both of Ohio

[73] Assignee: Precision Strip Technology, Inc., Minster, Ohio

[21] Appl. No.: 393,832

[22] Filed: Jun. 30, 1982

[51] Int. Cl.³ .................. B23D 25/12; B23D 19/08; B26D 3/10
[52] U.S. Cl. .................................. 83/333; 83/343; 83/344; 83/503; 83/507
[58] Field of Search ............... 83/333, 343, 344, 503, 83/507

[56] References Cited

U.S. PATENT DOCUMENTS

| | | | |
|---|---|---|---|
| 2,222,051 | 11/1940 | Tyrrell | 83/503 X |
| 3,373,627 | 1/1966 | Wesstrom | 74/440 |
| 3,388,582 | 6/1963 | Wesstrom et al. | 72/335 |
| 3,456,323 | 7/1969 | Huyvaert et al. | 29/200 |
| 3,517,532 | 6/1970 | Zilkowsky et al. | 72/31 |
| 4,205,596 | 6/1980 | Chesnut | 83/344 X |

OTHER PUBLICATIONS

Catalog entitled "Schmidt Couplings".
Catalog entitled "Alcoa/Monarch Stamco", 1978.

*Primary Examiner*—E. R. Kazenske
*Assistant Examiner*—Taylor Ross
*Attorney, Agent, or Firm*—Wood, Herron & Evans

[57] ABSTRACT

A scroll-type slitting machine of the type having upper and lower arbors, each having a plurality of mating rotary cutting members, a movable housing rotatably supporting ends of the upper and lower arbors, a fixed housing rotatably supporting opposite ends of the upper and lower arbors, and a mechanism for vertically adjusting at least one of the arbors relative to the other, includes the improvement which consists of a pinion stand mounted outboard of and adjacent one of the housings, upper and lower intermeshing, synchronizing gears rotatably mounted within the pinion stand, and upper and lower torque-transmitting couplings extending between and operatively joining the upper and lower synchronizing gears to the upper and lower arbors, respectively, while permitting relative movement between the arbors.

7 Claims, 5 Drawing Figures

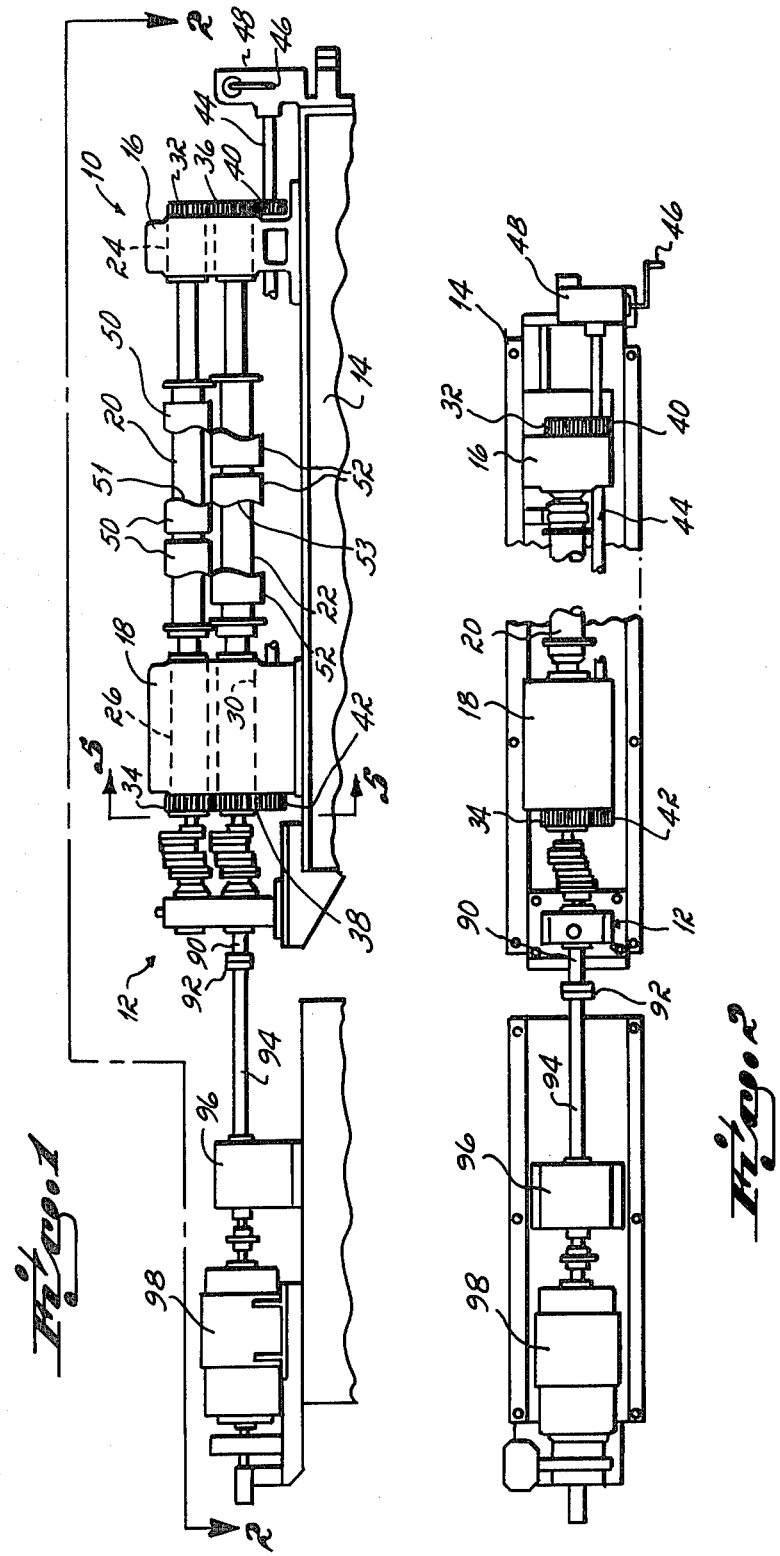

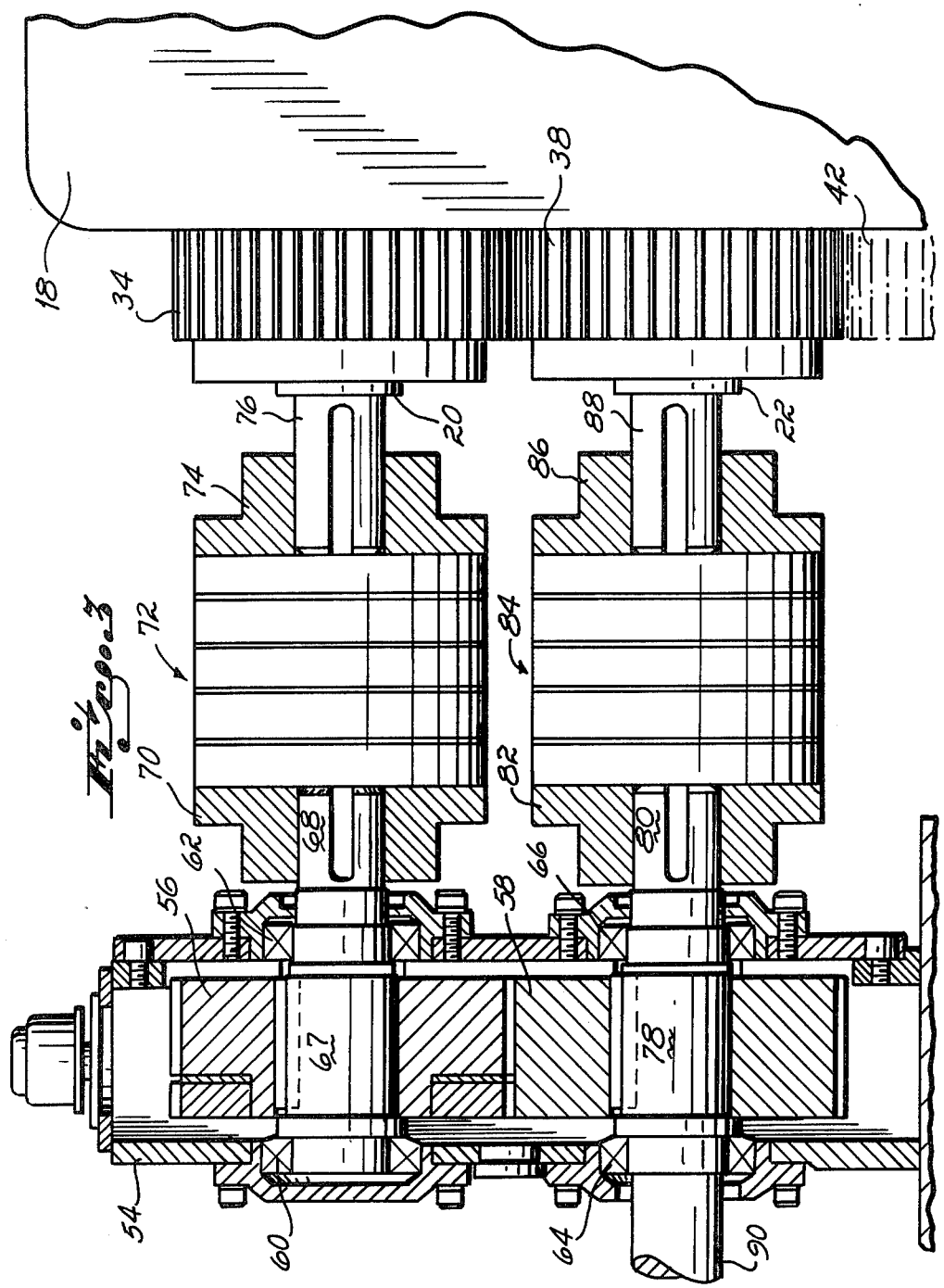

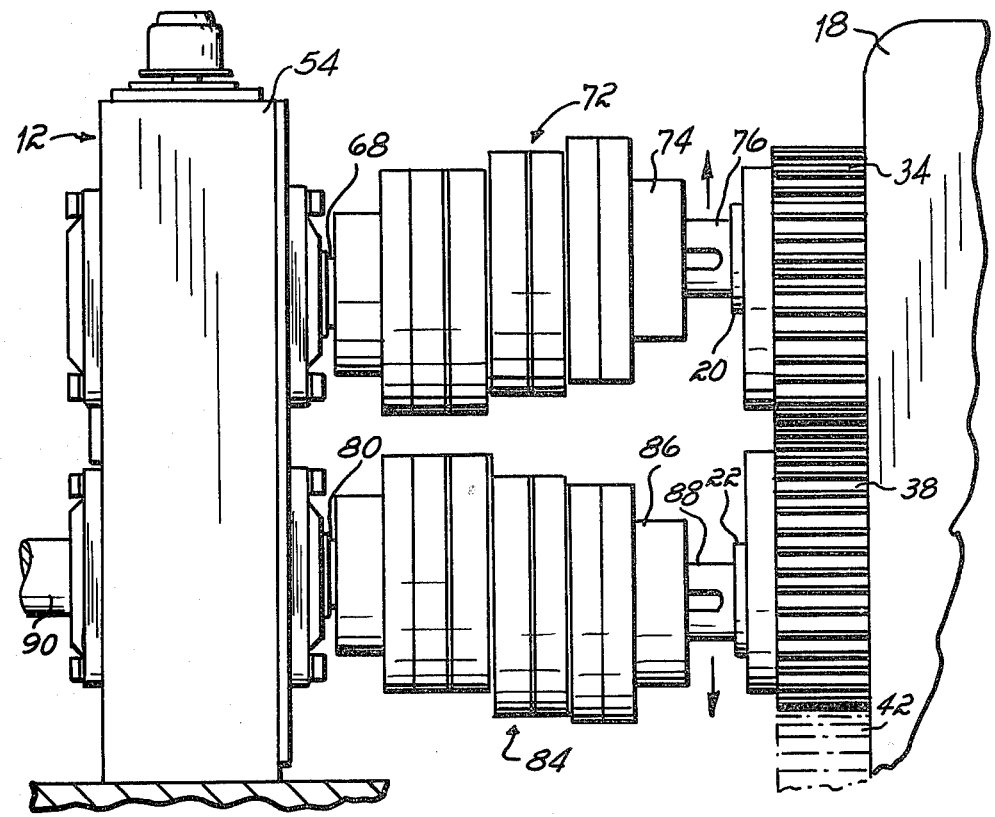
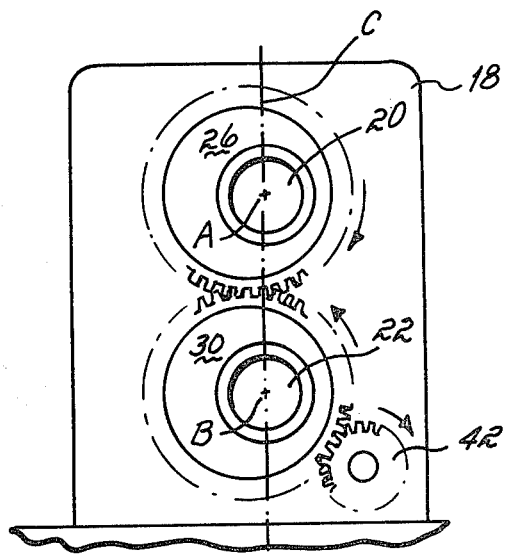

SLITTING APPARATUS

BACKGROUND OF THE INVENTION

The present invention relates to slitting apparatus and, in particular, to apparatus for continuous scroll slitting of sheet metal or similar material, in which scroll knives are mounted on arbors which are adjustable relative to each other in order to accommodate scroll knives of different diameters.

Prior Art

In order to form a plurality of relatively narrow strips from a single, relatively wide web of metal such as steel, it is commonly known to utilize a slitting line. Slitting lines basically consist of an uncoiler from which a web of metal is unwound from a coil, a slitter which slits the web into a plurality of strips, and a recoiling mechanism which recoils the strips into individual strip coils.

The slitting mechanism typically includes upper and lower arbors which are rotatably mounted in housings. Each arbor includes a plurality of rotary cutting members positioned so that the cutting members on the upper arbor intermesh or mate with the cutting members on the lower arbor to provide a cutting or slitting operation upon a web of metallic material.

If strips are to be formed having rectilinear longitudinal edges, the rotary cutting members mounted on the arbors are essentially disk-shaped, having circular peripheries. However, if the slitter is adapted to form strips having curvilinear longitudinal edges, cutting members or knives provided with serpentine or sinuous cutting edges are required. Slitters of this type are known as scroll slitters.

It is desirable to slit a metallic web into strips having serpentine or curvilinear longitudinal edges if circular or disk-shaped peices are to be formed from the slit strips, such as can ends, motor armatures and brake backing plates. The serpentine edges reduce the amount of material wasted in the forming of the disk-shaped pieces from the strips. An example of this type of slitting process is disclosed in U.S. Pat. No. 3,517,532.

Since the cutting edges of knives used in scroll slitting are serpentine or sinuous, the relative rotational positions of mating scroll knives must be maintained in synchronization so that their cutting edges meet properly as the arbors are rotated. In order to effect this synchronization, usual practice is to provide intermeshing synchronization gears mounted on the upper and lower arbors, either within the arbor housings or inboard of the housings, so that the arbors rotate at the proper speed relative to each other. An example of such a slitting apparatus is disclosed in U.S. Pat. No. 3,373,627.

The slitting apparatus shown in this patent is adjustable to accommodate metallic webs of different thicknesses and to permit different diameter knives to be mounted on the arbors. Therefore, the upper arbor is disclosed as being vertically adjustable in its supports relative to the lower arbor by a rotatable hand wheel which drives a conventional motion transmitting mechanism mounted in the housings which support the arbors.

For relatively small movements between the arbors, synchronization gears in the form of split gears are provided which can be modified to increase the effective thickness of the gear teeth to compensate for and reduce the backlash and clearance created by small relative movements of the arbors mounting the gears.

However, when it is desired to change the amplitude of the scroll slitting pattern, it is necessary to change the knives to others of larger or smaller diameter, and this in turn requires replacing the synchronizing gears with others of correspondingly larger or smaller diameter. Thus, each set of cutters or knives is provided with a matching set of gears. Obviously, set up time is increased where synchronization gears as well as cutters must be changed each time a different set of cutters is installed, and the expense of multiple sets of gears as well as their storage, creates additional disadvantages and problems.

Accordingly, there is a need for a scroll slitting apparatus which includes means for synchronizing the rotation of the arbors without the necessity of multiple sets of synchronizing gears and the necessity of having to dismantle the slitting apparatus to substitute different synchronization gears each time a different set of knives is required. Furthermore, there is a need for a synchronization apparatus which is relatively inexpensive in relation to the overall cost of the slitting apparatus, and one which does not have large height and width requirements so that the slitting apparatus may remain a relatively compact unit.

SUMMARY OF THE INVENTION

The present invention provides an improved adjustable slitting apparatus in which upper and lower arbors may be positioned closer together or farther apart, and in which the rotational synchronization of the arbors is maintained outboard of, prior to and independently of the center-to-center spacing of the arbors and without the necessity of maintaining multiple sets of synchronization gears of differing diameters. The slitting machine of the present invention includes a synchronization apparatus which is relatively inexpensive in relation to the cost of the entire slitting machine and which is relatively easy to fabricate and, once installed, to maintain.

The present invention comprises slitting apparatus having upper and lower arbors, a plurality of upper and lower mating rotary cutting members or knives mounted on the arbors, a movable housing rotatably supporting first ends of the upper and lower arbors, a fixed housing rotatably supporting opposite ends of the upper and lower arbors, and mechanism for adjusting the position of at least one of the arbors relative to the other, in which the improvement includes a pinion stand mounted outboard of and adjacent one of the housings, upper and lower intermeshing synchronizing gears rotatably mounted in the pinion stand, and upper and lower torque-transmitting, zero backlash, constant angular velocity couplings which extend between and operatively join the upper and lower synchronizing gears to the upper and lower arbors, respectively, while permitting adjustment of the arbors relative to each other to accommodate scroll knives or cutters of different diameters, but which only one set of synchronizing gears for all sets of knives.

In a preferred embodiment of the invention, one of the synchronizing gears includes an axle having an end adapted to be driven by a motor and an opposite end joined to one of the torque-transmitting couplings. Since the axle is limited to rotational movement, it may be directly coupled to a gear reducer which preferably is driven by an electric motor.

It is also preferred to utilize synchronization gears which are adjustable split gears in which the effective circular thickness of the gear teeth may be varied to reduce backlash and play between the intermeshing teeth of the synchronization gears for rotation in either direction. However, since the synchronization gears are mounted within a fixed pinion stand located outboard of the housings and are not moved relative to each other, the gears may be manufactured to relatively closely tolerances and thus not have a sufficient amount of backlash to present a problem in synchronizing the rotation of the arbors and the rotary cutting members carried by them. If split gears are used, adjustment would be required on an infrequent basis since the gears are not moved relative to each other.

Although any type of torque-transmitting coupling may be utilized which meets the requisite strength and displacement requirements, a preferred coupling is the type shown in U.S. Pat. No. 3,242,694. These couplings are desirable in that there is a minimum of play or backlash in the coupling, and there is no change in performance of the coupling at differing input and output shaft displacements. Furthermore, the couplings are desirable in that they provide an output having an angular velocity which is equal to the angular velocity of the input. Thus, the synchronization of rotational velocities achieved by the synchronizing gears is maintained in the transmission from the synchronizing gears to the upper and lower arbors.

Accordingly, it is an object of the present invention to provide scroll slitting apparatus which includes synchronization gears mounted outboard of the arbor housings so that the arbors may be adjusted relative to each other without the necessity of substituting synchronization gears; to provide scroll slitting apparatus having synchronization gears located outboard of the arbor housings which transmit rotary motion to the arbors with a minimum of slippage and backlash to provide accurate synchronization of the scroll knives; and to provide scroll slitting apparatus having synchronization gears mounted outboard of the arbor housings in a pinion stand which is relatively inexpensive to manufacture and relatively easy to maintain.

Other objects and advantages of the invention will be apparent from the following description, the accompanying drawings and the appended claims.

BRIEF DESCRIPTION OF THE DRAWINGS

FIG. 1 is a side elevation of the preferred embodiment of the adjustable slitting apparatus of the present invention;

FIG. 2 is a plan view of the slitting apparatus of FIG. 1 taken at line 2—2 of FIG. 1;

FIG. 3 is a detail of the slitting apparatus of FIG. 1 showing the pinion stand and synchronizing gears in section;

FIG. 4 is a detail of the slitting apparatus of FIG. 1 showing the arbors rotated away from each other; and FIG. 5 is an end view of the fixed housing of the slitting apparatus taken at line 5—5 of FIG. 1.

DESCRIPTION OF THE PREFERRED EMBODIMENT

As shown in FIGS. 1 and 2, the adjustable slitting apparatus of the present invention includes a scroll slitter, generally designated 10, a synchronizing mechanism 12, and a base 14 for supporting the synchronizing mechanism and scroll slitter. The scroll slitter 10 includes a movable housing 16 which is slidably positionable along the base 14, a fixed housing 18 which is rigidly mounted to the base, and upper and lower arbors 20,22, respectively.

The upper arbor 20 is rotatably mounted within upper journal bearings 24,26 mounted within the movable and fixed housings 16,18, respectively. Similarly, the lower arbor 22 is rotatably mounted within lower journal bearings 28,30 rotatably mounted within the movable and fixed housings 16,18. The upper journal bearings 24,26 include upper pinions 32,34, and the lower journal bearings 28,30 include lower pinions 36,38 which intermesh with upper pinions 32,34, respectively.

Drive pinions 40,42 are mounted on a shaft 44 which extends the length of the scroll slitter 10 and is rotatably supported in the movable and fixed housings 16,18. The drive pinions 40,42 mesh with the lower pinions 36,38, respectively. The shaft 44 is operatively connected to a hand-operated crank 46 by a gearing mechanism 48 of conventional design.

The upper and lower arbors 20,22 are each eccentrically mounted within their respective journal bearings 24,26,28,30. This is best shown in FIG. 5 in which the upper and lower arbors 20,22 are shown positioned to the right of the centers of the upper and lower journal bearings 26,30. The location and positioning of the upper and lower arbors 20,22 within the upper and lower journal bearings 24,28, mounted within the movable housing 16, not shown in FIG. 5, would be identical in position.

Rotation of the shaft 44 by turning the crank 46 causes the drive pinions 40,42 to rotate the lower pinions 36,38 which in turn rotate upper pinions 32,34 in an opposite direction. Thus, the centers of the upper and lower arbors 20,22, designated by points A,B, respectively, will always lie upon a common vertical line, represented by line C in FIG. 5. Rotation of the pinions 32,34,36,38 thus causes the upper and lower arbors 20,22 to be moved toward or away from each other.

As shown in FIG. 1, the upper arbor 20 includes a plurality of upper rotary cutting members 50, and the lower arbor 22 includes a plurality of lower rotary cutting members 52 which intermesh with the upper cutting members. The upper and lower cutting members 50,52 include curvilinear cutting edges 51,53, which intermesh during the scroll slitting operation.

Scroll slitting is known from prior art patents, as noted above. The improvement here consists of the manner in which synchronization is maintained between sets of cutters or knives of different diameters. The synchronization mechanism 12, as best seen in FIGS. 1-4, includes a pinion stand 54 which supports an upper synchronizing gear 56 and a lower synchronizing gear 58. The upper synchronizing gear 56 is rotatably mounted within upper bearings 60,62 and the lower synchronizing gear 58 is mounted within bearings 64,66. The synchronizing gear 56 is preferably a split or adjustable gear which can be adjusted after mounting within bearings 60,62 in order to eliminate any play or backlash in the meshing with the lower synchronizing gear 58.

The upper synchronizing gear 56 is mounted to an axle 67 which includes a stub 68 that extends outwardly from the pinion stand 54 toward the fixed housing 18 and is mounted to an end 70 of upper, torque-transmitting coupling 72. An opposite end 74 of the upper torque-transmitting coupling 72 is mounted to a stub 76 which extends outwardly from the end of the upper arbor 20.

Similarly, the lower synchronizing gear 58 is mounted to an axle 78 which includes a stub 80 that extends outwardly from the pinion stand 54 and is mounted to an end 82 of a lower coupling 84. Lower coupling 84 includes an opposite end 86 which is attached to a stub 88 extending outwardly from the lower arbor 22. Upper and lower couplings 72,84 may be of any conventional type but a preferred coupling is type NSSW coupling manufactured by Schmidt Couplings, Inc., Cincinnati, Ohio. Such couplings permit a substantial displacement of input and output shafts without variance in angular velocity and with substantially zero backlash.

The axle 78 supporting the lower synchronization gear 58 includes an end 90 opposite stub 80 which is adapted to mount a coupling 92 of conventional design which is joined to the drive shaft 94 of a gear reducer 96 driven by an electric motor 98 (shown in FIGS. 1 and 2).

As shown in FIG. 4, displacement of the upper and lower arbors 20,22 as a result of rotation of the upper and lower pinions 34,38 by drive pinion 42 causes the stubs 76,88 projecting from the upper and lower arbors to be displaced apart from each other. The ends 74,86 of the upper and lower couplings 72,84 are displaced along with the stubs. Thus, the upper and lower couplings 72,84 permit rotary motion to be transmitted from the synchronization gears within the pinion stand 54 to the upper and lower arbors 20,22 even though the axis of rotation of the stub 68 projecting from the upper synchronizing gear is not colinear with the stub 76 projecting from the upper arbor 20, and the end stub 80 projecting from the lower synchronizing gear is not colinear with the end stub 88 projecting from the lower arbor 22. In this fashion, rotary power may be transmitted from the motor 98 (FIGS. 1 and 2) through the synchronizing mechanism 12 and to the upper and lower arbors 20,22, regardless of their relative positions within the movable and fixed housings 16,18 and without the necessity of substituting different sized synchronizing gears.

The operation of the adjusting slitting apparatus of the present invention is as follows. Prior to the slitting operation, the upper and lower arbors 20,22 are adjusted relative to each other to provide the proper degree of clearance between the upper and lower mating rotary cutting members 50,52. This spacing is a function of the thickness of the metallic web (not shown) which is to be slit by the apparatus. The motor 98 is activated, which drives the gear reducer 96, which in turn rotates the output shaft 94 and the lower synchronizing gear 58. Rotation of the lower synchronizing gear 58 rotates the meshing upper synchronizing gear 56 and the lower coupling 84. Rotation of the upper synchronizing gear 56 rotates the upper coupling 72, and the upper and lower couplings together rotate the upper and lower arbors 20,22. Since the upper and lower synchronizing gears 56,58 provide proper rotational speeds for the upper and lower rotary cutting members 50,52, the cutting members engage each other in proper synchronization regardless of the relative position of the upper and lower arbors 20,22.

While the form of apparatus herein described constitutes a preferred embodiment of this invention, it is to be understood that the invention is not limited to this precise form of apparatus and that changes may be made therein without departing from the scope of the invention.

What is claimed is:

1. A scroll slitting apparatus comprising,
   a pair of spaced, parallel arbors,
   a plurality of mating rotary cutting members having sinuous cutting edges mounted on said arbors,
   means for rotatably supporting said arbors,
   means for simultaneously moving both of said arbors to vary the spacing of said arbors relative to a fixed cutting plane,
   a pair of intermeshing synchronizing gears rotatably mounted outboard of and adjacent said arbor supporting means; and
   a pair of substantially constant angular velocity, zero backlash coupling means, each one of said pair of coupling means extending between and operatively coupling one of said pair of synchronizing gears to one of said arbors respectively for transmitting torque from said synchronizing gears to one of said arbors while permitting relative displacement of said arbors with respect to each other.

2. The apparatus of claim 1 wherein one of said synchronizing gears includes an axle having an end adapted to be driven by a motor and an opposite end joined to one of said coupling means.

3. The apparatus of claim 2 wherein said synchronizing gears include means for reducing backlash in said gears.

4. The apparatus of claim 1 wherein said means for rotatably supporting ends of said arbors comprise a fixed housing and a movable housing movable with respect to said fixed housing.

5. The apparatus of claim 1 wherein said arbors comprise upper and lower arbors, ends on said arbors, and said ends of said arbors being supported for eccentric translational movement with respect to their axes for varying the spacing thereof.

6. The apparatus of claim 1 wherein said synchronizing gears comprise upper and lower gears, and said lower gear is driven to thereby rotate said upper gear and said arbors.

7. Slitting apparatus comprising spaced, parallel, upper and lower arbors, a plurality of sets of scroll-type rotary knives having sinuous cutting edges carried by said arbors with opposing edges of said sets synchronized with respect to each other for producing a scroll slitting pattern in sheet metal passed between said sets of knives, a movable housing for rotatably mounting one end of each of said upper and lower arobrs, a fixed housing for rotatably mounting opposite ends of said upper and lower arbors,
   means within each of said housings for effecting movement of at least one of said arbors to vary the spacing between said upper and lower arbors, intermeshing upper and lower synchronizing gears rotatably mounted outboard of said fixed housing, one of said upper and lower synchronizing gears comprising a split gear having two relatively adjustable sections for enabling all backlash between said upper and lower synchronizing gears to be eliminated, drive means connected to one of said synchronizing gears for rotation thereof, and substantially constant angular velocity, zero backlash torque-transmitting coupling interconnecting said upper and lower gears and said upper and lower arbors, respectively, while permitting relative movement of said arbors transversely of the axes thereof without substantial change in the angular velocity of said gears with respect to said arbors, thereby to permit said arbors to be spaced from each other at different distances to accommodate rotary knives of different diameters and produce scroll patterns of different amplitudes without the necessity of changing said synchronizing gears.

* * * * *